Feb. 19, 1952 — R. M. MARTIN — 2,586,679
SNAP HOOK
Filed April 4, 1947
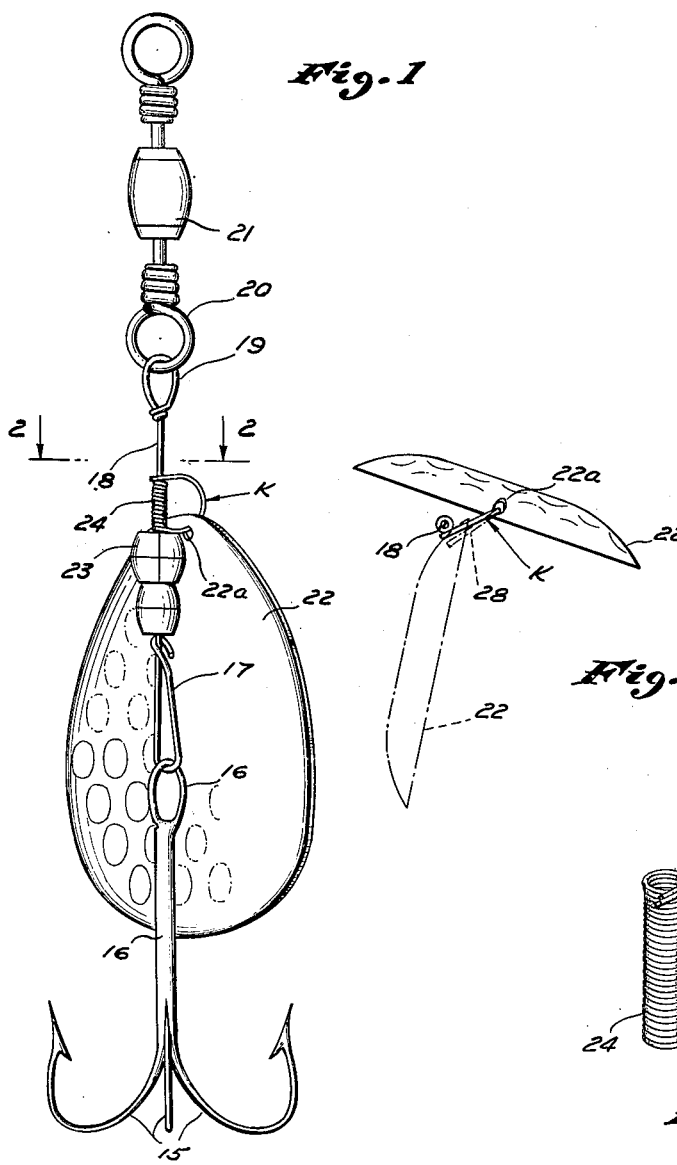
INVENTOR.
RUTH M. MARTIN
BY
ATTORNEY Patented Feb. 19, 1952

2,586,679

UNITED STATES PATENT OFFICE 2,586,679

SNAP HOOK

Ruth M. Martin, Los Angeles, Calif.

Application April 4, 1947, Serial No. 739,413

1 Claim. (Cl. 24—237)

My invention relates to spinner attachments for fishhooks used as lures in trolling, and particularly, although not necessarily, to spoons.

It is highly desirable to have the spoons detachable from the fishhooks to permit substitution of other spoons having different visual characteristics, so as to allow one to experiment and select that spoon having those visual characteristics most favorable to prevailing weather and water conditions, to attract the attention of fish and thus facilitate catching thereof.

It is a purpose of my invention to provide a simple, inexpensive, and effective means for quickly connecting and disconnecting a spoon to a fishhook, and thus permit interchanging therewith of other spoons so as to afford attachment of the most desirable spoon as to visual characteristics in accordance with prevailing conditions, to facilitate the catching of fish.

It is also a purpose of my invention to provide a connector for spoons which permits the snapping on or off of the spinner shaft of a fishhook, of the spoon in the attachment or detachment thereof to the shaft, and when attached the spoon cannot become accidentally detached and lost.

I will describe a conventional form of trolling fishhook and only one form of spoon connector therefor embodying my invention, and will then point out the novel features thereof in the claim.

In the accompanying drawings:

Figure 1 is a view showing in side elevation a trolling fishhook having applied to the spinner shaft thereof, one form of spoon connector embodying my invention.

Figure 2 is a transverse sectional view taken on the line 2—2 of Figure 1, and showing in broken lines the spoon in the act of being detached from the spinner shaft.

Figure 3 is an enlarged detailed perspective view of the connector.

With specific reference to the drawings, I have shown in Fig. 1 a conventional form of fishhook used for trolling, and wherein it comprises a plurality of hooks 15 fixed on the lower end of a shank 16. This shank is formed at its upper end with an eye 16 connected to a snap loop 17 formed on the lower end of a spindle shaft 18. The upper end of this shaft is provided with an eye 19 which is connected to the lower eye 20 of a conventional swivel 21. A conventional spoon 22 is mounted on the shaft 18 for rotational movement at a point above and spaced from the loop 17 by means of one or more colored and faceted objects 23 mounted on the shaft 18, so that the spoon as mounted cannot strike the hooks 15, in its rotational movement on the shaft.

The means for mounting the spoon 22 on the shaft 18 constitutes my invention and, in this embodiment, comprises a connector designated generally at K which may include a sleeve 24 and a latch member 25. The sleeve is of such internal diameter as to freely receive a portion of the spinner shaft 18 and to thus be rotatable thereon, it being applied to the shaft at the upper end thereof before bending such end to form the loop 19.

The latch member 25 may be of general U-form to provide a curved bight portion 26 and substantially linear terminal portions 27 and 28. The terminal portion 27 is fixed to the lower end of the sleeve 24 and extends tangentially therefrom, while the terminal portion 28 bears against the side of the sleeve adjacent the upper end thereof. This association of member 25 to sleeve 24 positions the intermediate member portion 26 laterally of the sleeve, and thus the member in its entirety and in conjunction with the sleeve, forms a closed loop from which the spoon 22 can be suspended.

The member 25 is urged to closed loop position so that it can be opened to allow the application or removal of a spoon, but once the spoon is applied the member serves to retain the spoon on the spinner against accidental displacement and loss, and yet by opening the loop through manual manipulation of the spoon (see Fig. 2) the spoon is quickly detachable from the connector.

In the present instance, urging of the member 25 to closed position is attained by constructing the whole connector from a single length of resilient wire, the sleeve 24 being formed by coiling the wire to provide a spring, and at the lower end of the coil the wire is extended tangentially from the spring so that the member is urged by the spring to maintain the free end portion 28 against the upper end of the coil. With the member portion 28 so urged by the spring sleeve 24, it will be clear from a consideration of Fig. 2, that to apply or remove a spoon to or from the connector, it is only necessary to move the portion 28 laterally away from the sleeve, which is accomplished by extending the spoon between the two, when the loop is opened to permit the portion 28 to be extended through or withdrawn from the usual opening 22a of the spoon.

The urging action of the spring sleeve as imposed on the portion 28, is such that once the spoon is applied, it is held against accidental detachment from the connector, and because of the curvature of the bight portion 26, the spoon in its rotative movement about the shaft 18 as it does in actual use, is free to assume various positions on the member 25 without becoming detached therefrom.

Because of the ready mode of attachment and detachment of a spoon to the spinner shaft, afforded by my connector, the trial and selection of that particular spoon having those visual characteristics most favorable to prevailing conditions of weather and water for attracting fish of any particular species, can be accomplished with facility and dispatch.

Although I have herein shown and described only one form of connector for spoons or other forms of spinner attachments for fishhooks, it is to be understood that various changes and modifications may be made therein without departing from the spirit of my invention and the spirit and scope of the appended claim.

I claim:

A connector for detachably securing a spoon to the spindle shaft of a fish hook, comprising, a sleeve of coiled resilient wire having one end of the wire extended tangentially from one end of the sleeve, and looped upon itself at one side of the sleeve so that its free end extends across and is urged against the other end of the sleeve.

RUTH M. MARTIN.

REFERENCES CITED

The following references are of record in the file of this patent:

UNITED STATES PATENTS

| Number | Name | Date |
|---|---|---|
| 281,083 | Kessler | July 10, 1883 |
| 923,854 | Kenyon | June 8, 1909 |

FOREIGN PATENTS

| Number | Country | Date |
|---|---|---|
| 852,612 | France | Oct. 30, 1939 |